(12) United States Patent
Lindh

(10) Patent No.: US 11,579,687 B2
(45) Date of Patent: Feb. 14, 2023

(54) METHOD AND SYSTEM FOR DETERMINING A CURRENT GAZE DIRECTION

(71) Applicant: Tobii AB, Danderyd (SE)

(72) Inventor: Fredrik Lindh, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/781,178

(22) Filed: Feb. 4, 2020

(65) Prior Publication Data

US 2020/0278746 A1   Sep. 3, 2020

(30) Foreign Application Priority Data

Feb. 4, 2019 (SE) .................................... 1930040-9

(51) Int. Cl.
 *G06T 15/20* (2011.01)
 *G06F 3/01* (2006.01)
 *G06T 7/20* (2017.01)

(52) U.S. Cl.
 CPC .............. *G06F 3/013* (2013.01); *G06F 3/017* (2013.01); *G06T 7/20* (2013.01); *G06T 15/205* (2013.01); *G06T 2207/30201* (2013.01)

(58) Field of Classification Search
 CPC . G06F 3/013; G06F 3/017; G06T 7/20; G06T 15/205; G06T 2207/30201;
 (Continued)

(56) References Cited

U.S. PATENT DOCUMENTS 9,965,031 B2   5/2018  Mantiuk et al.
2012/0256967 A1*  10/2012  Baldwin ............... G06F 3/0485
                                                              345/684

(Continued)

FOREIGN PATENT DOCUMENTS

CA     2915028 A1    6/2017
CN   109144240 A    1/2019
(Continued)

OTHER PUBLICATIONS

Helton M. Peixoto et al., Image Processing for Eye Detection and Classification of the Gaze Direction, Jun. 1, 2009, IEEE Xplore, pp. 2475-2480 (Year: 2009).*
Suzan Anwar et al., Real Time Eye Gaze Estimation, Dec. 1, 2017, IEEE Xplore, pp. 526-531 (Year: 2017).*
Stanislav Panev et al., Human Gaze Tracking in 3D Space With An Active Multi-Camera System, Sep. 1, 2013, IEEE Xplore, pp. 419-424 (Year: 2013).*
Julian Schwehr et al., Dirver's Gaze Prediction in Dynamic Automitive Scenes, Oct. 1, 2017, IEEE Xplore, pp. 1-8 (Year: 2017).*
(Continued)

*Primary Examiner* — Tam T Tran
(74) *Attorney, Agent, or Firm* — Kilpatrick Townsend & Stockton LLP

(57) ABSTRACT

A method for determining a current gaze direction of a user in relation to a three-dimensional ("3D") scene, the 3D scene sampled by a rendering function to produce a two-dimensional ("2D") projection image of the 3D scene, the sampling performed based on a virtual camera in turn being associated with a camera position and camera direction in the 3D scene. The method includes determining, by a gaze direction detection means, a first gaze direction of the user related to the 3D scene at a first gaze time point. The method includes determining a time-dependent virtual camera 3D transformation representing a change of a virtual camera position and/or virtual camera direction between the first gaze time point and a second sampling. The method includes determining the current gaze direction as a modified gaze direction calculated based on the first gaze direction and an inverse of the time-dependent virtual camera 3D transformation.

17 Claims, 4 Drawing Sheets

(58) Field of Classification Search
CPC ......... G06T 7/246; G06T 7/70; G06T 3/0031; G06T 19/00; G09K 9/00201; H04N 13/117; H04N 13/383; G06K 9/00201
See application file for complete search history.

(56) References Cited

U.S. PATENT DOCUMENTS

| | | |
|---|---|---|
| 2014/0146148 A1 | 5/2014 | Maciocci |
| 2014/0168389 A1 | 6/2014 | Han et al. |
| 2015/0082181 A1* | 3/2015 | Ames ............... G06F 3/0487 715/738 |
| 2017/0053452 A1 | 2/2017 | Arai |
| 2017/0068316 A1* | 3/2017 | Seok ............... G06F 3/0237 |
| 2018/0004285 A1 | 1/2018 | Castleman |
| 2018/0227630 A1* | 8/2018 | Schmidt ........... H04N 21/44008 |
| 2018/0365882 A1 | 12/2018 | Croxford et al. |
| 2019/0147607 A1* | 5/2019 | Stent ............... G06T 7/73 382/103 |

FOREIGN PATENT DOCUMENTS

| | | |
|---|---|---|
| EP | 2709060 A1 | 3/2014 |
| WO | 2016154123 A2 | 9/2016 |

OTHER PUBLICATIONS

Bernhard, et al., "Gaze-To-Object Mapping during Visual Search in 3D Virtual Environments", ACM Transactions an Applied Perception, vol. 11, No. 3, Oct. 2014, pp. 1-17.
CN202010078496.X, "Office Action", dated Jun. 18, 2021, 8 pages.
EP20154283.4, "Extended European Search Report", dated Jul. 1, 2020, 8 pages.
SE1930040-9, "Search Report", dated Sep. 2, 2019, 3 pages.

* cited by examiner

METHOD AND SYSTEM FOR DETERMINING A CURRENT GAZE DIRECTION

CROSS-REFERENCES TO RELATED APPLICATIONS

This application claims priority to Swedish Application No. 1900040-9, filed Feb. 4, 2019; the content of which are hereby incorporated by reference.

TECHNICAL FIELD

The present invention relates to a method for determining a current gaze direction of a user in relation to a three-dimensional ("3D") scene. The invention also relates to a system and to a computer software function for performing such a method.

Embodiments of the present invention relate to tracking a user's gaze when the user is observing a 3D scene, and in particular how to determine a point or a zone to which a user's gaze is currently directed in the 3D scene.

BACKGROUND OF INVENTION

It is known to detect an eye and its gaze direction. This can be done, for example, by illuminating a region in which the eye is sought with infrared radiation; capturing an image of the region; and detecting bright spots in the image that derive from the pupil and cornea of the eye. This approach exploits the bright-eye or "red-eye" effect known to photographers, whereby light enters the eye and is reflected or absorbed and re-emitted through the pupil, making the pupil appear brighter than the rest of the eye and the face. A separate, smaller bright spot (also referred to as a glint) is created by the cornea. The relative positions of the pupil and the corneal glint can be used to determine the direction of the gaze of the eye. More details are given in U.S. Pat. No. 6,152,563.

Alternatively, or in addition thereto, a similar technique may be used whereby infrared illuminators are spaced from an image sensor, thus an image captured by the image sensor has a non-bright pupil, otherwise known as a "dark pupil" effect.

This gaze tracking technology may be implemented in a remote gaze tracker located adjacent a display for example, or in a wearable device such as a pair of glasses, a virtual reality headset, an augmented reality headset, a helmet or the like.

Such gaze tracking technology can be used to determine if a user is looking at a particular object or an area on a screen (these objects or areas are generically referred to as 'zones' in the present application). This could be as part of a game, for example, allowing users to interact with images on a screen by looking at them (the act of looking at the image having a predetermined result) or by a combination of looking at an image and another control (e.g., a user pressing a key on a keyboard or mouse whilst their gaze is directed at the image).

When determining where in relation to a 3D scene the gaze of a user is currently directed, consideration must be taken to the physical gaze direction of the user, in relation to a physical viewing region such as a screen. However, consideration must also be taken to the current state of the 3D scene itself, and to the virtual camera's current virtual 3D space position and direction.

It has turned out that, due to various latencies, the user experience will typically be less than perfect in, for example, dynamic game situations where all these parameters may change quickly.

For instance, consider a user watching a particular object in a virtual 3D scene as shown on a monitor screen. The watched object is then present at a particular location on the said screen. Then, the virtual camera used to render the 3D scene into the 2D image viewed on the screen is rotated and/or translated, and as a result the viewed 2D image changes correspondingly. However, because of latency, the gaze point of the user on the said screen will remain the same until the user's eyes have reacted to the virtual camera shift, by the user moving her gaze so as to again focus on the said object, which has previously moved as a result of the virtual camera shift. Thereafter, hardware latency results in a time delay before the game controller (or similar) detects the changed user gaze point on the screen, so that a user interaction function can react appropriately.

As the 3D scene changes in itself, such as by the said object moving through the virtual 3D scene, similar latency effects will result, even if the virtual camera position or direction does not change.

These problems result not only in a poorer user experience, but also limit the time-wise granularity with which a user interaction with the 3D scene can be implemented.

Particular problems arise for GTOM (Gaze To Object Mapping) implementations, in which a system attempts to detect a movable object on the screen as a currently focussed object which the user follows with her gaze.

These problems may be partially overcome by providing faster hardware and more efficient software. However, this is expensive and doesn't solve all of the problems.

Hence, there are a number of problems regarding how to efficiently implement gaze tracking in dynamically updated 3D scenarios. The present invention aims to at least partially overcome these problems.

SUMMARY OF INVENTION

Hence, the invention relates to a method for determining a current gaze direction of a user in relation to a three-dimensional ("3D") scene, which 3D scene is sampled by a rendering function to produce a two-dimensional ("2D") projection image of the 3D scene, which sampling is performed based on a virtual camera in turn being associated with a camera position and camera direction in the 3D scene, wherein the method comprises the steps: determining, by a gaze direction detection means, a first gaze direction of the user at a first gaze time point, which first gaze direction is related to said 3D scene; determining a virtual camera 3D transformation, which 3D transformation represents a change of a virtual camera position and/or virtual camera direction between the first gaze time point and a second sampling time point, where the second sampling time point is later than the first gaze time point; and determining the said current gaze direction as a modified gaze direction, in turn calculated based on the first gaze direction, and further calculated based on an inverse of said time-dependent virtual camera 3D transformation.

Furthermore, the invention relates to a system for determining a current gaze direction of a user in relation to a three-dimensional ("3D") scene, which 3D scene is sampled by a rendering function to produce a two-dimensional ("2D") projection image of the 3D scene, which sampling is performed based on a virtual camera in turn being associated with a w camera position and camera direction in the 3D scene, which system comprises a gaze direction detection means arranged to determine a first gaze direction of the user at a first gaze time point, which first gaze direction is related to said 3D scene, which system is arranged to determining a virtual camera 3D transformation, which 3D transformation represents a change of a virtual camera position and/or virtual camera direction between the first gaze time point and a second sampling time point, where the second sampling time point is later than the first gaze time point, and which system is arranged to determine the said current gaze direction as a modified gaze direction, in turn calculated based on the first gaze direction, and further calculated based on an inverse of said time-dependent virtual camera 3D transformation.

Moreover, the invention relates to a computer software function arranged to, when executing, determine a current gaze direction of a user in relation to a three-dimensional ("3D") scene, which 3D scene is sampled by a rendering function to produce a two-dimensional ("2D") projection image of the 3D scene, which sampling is performed based on a virtual camera in turn being associated with a camera position and camera direction in the 3D scene, wherein the computer software function is arranged to, when executing, further perform the following steps: determining, by a gaze direction detection means, a first gaze direction of the user at a first gaze time point, which first gaze direction is related to said 3D scene; determining a virtual camera 3D transformation, which 3D transformation represents a change of a virtual camera position and/or virtual camera direction between the first gaze time point and a second sampling time point, where the second sampling time point is later than the first gaze time point; and determining the said current gaze direction as a modified gaze direction, in turn calculated based on the first gaze direction, and further calculated based on an inverse of said time-dependent virtual camera 3D transformation.

In the following, the invention will be described in detail, with reference to exemplifying embodiments of the invention and to the enclosed drawings, wherein:

BRIEF DESCRIPTION OF DRAWINGS w FIG. 1 is a diagram for explaining how 3D scenes are rendered as a 2D image;

In all Figures, same reference numerals refer to same or similar parts.

DETAILED DESCRIPTION

The present invention relates to gaze tracking with respect to a 3D scene. The term gaze tracking is used herein to refer to any method or system that detects and/or monitors the location of an eye and/or the direction of the gaze of an eye. The skilled reader will be aware of and understand such systems.

It is also noted that the description also refers to "gaze-interactable" objects or zones. This phrase is intended to indicate objects that the system can detect a user's gaze being directed towards. This may or may not lead to an overt "interaction" for the user. For example, the user may see no sign when a system detects their gaze being directed at a gaze-interactable object. However, the fact that the object has been looked at will have been detected and may be used by the system (e.g., for statistical analysis) in a non-overt manner. Therefore, the term "gaze-interactable" should not be interpreted to require an overt interaction with the user.

Figure 1:
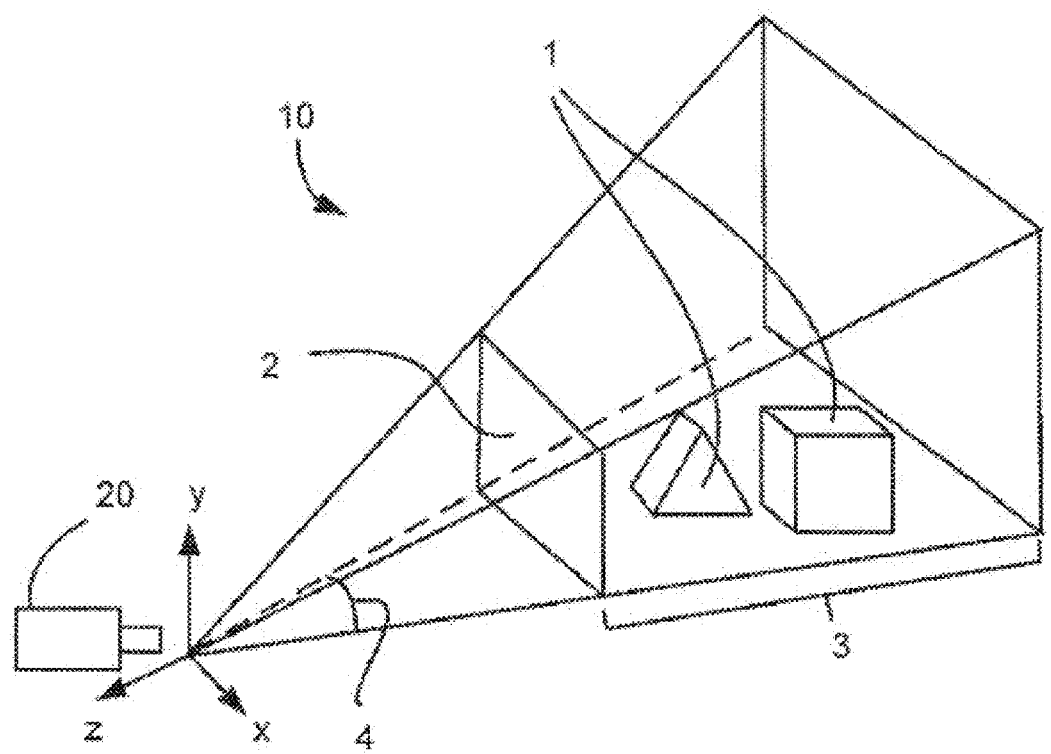

FIG. 1 provides an example of a 3D scene 10. Such a scene can be a virtual 3D scene, such as in a computer game or created for a virtual reality headset. The scene 10 contains 3D objects 1. Such objects 1 may move within the scene 10 over time. Indeed, the objects 1 may also move out of the scene 10 and other objects 1 may move into the scene. When such 3D scenes are viewed on a monitor or computer screen, the monitor or screen presents a 2D image representing a view on the 3D scene from a particular location in space, through a viewport 2. The viewport 2 delimits the image that would be seen by a virtual camera 20 or eye located at a notional position with respect to the 3D scene 10. The combination of the position of the virtual camera 20 and the viewport 2 sets the field of view 4. FIG. 1 also shows the view frustum 3, which is the region of the 3D scene 10 (i.e., extending to the rearmost part of the 3D scene 10) that is shown in the viewport 2.

The FIG. 1 diagram also applies to stereoscopic images, such as used in virtual reality headsets for example. In that case, each eye of a user is presented with a slightly different viewport 2 onto a scene 10, from which the user's brain then perceives a single 3D image. In this case each image is usually deformed in a non-linear fashion to compensate for lens characteristics. However, the underlying concepts are the same as discussed with reference to FIG. 1 for each image presented to each of the user's eye.

The 3D objects 1 may be notionally infinitely complex 3D shapes, constructed from polygons. The image viewed via the viewport 2 is a 2D projection of the 3D objects 1 onto the plane of the viewport 2 as seen from the position of the virtual camera 20, as discussed above. However, the screens on which the 2D viewport 2 images are displayed are com-posed of arrays of discrete elements or pixels. As such, the projections of the 3D objects 1 must be rasterized onto a display grid, by sampling the projected image at each of the screen pixel locations, to produce the image that will be presented as the visual scene (i.e., the scene observed through the viewport 2). The pixel values are stored in a memory area or buffer, as a 2D "bitmap" corresponding to the same dimensions as the screen or viewport 2.

Herein, such rasterization is herein generally denoted a "sampling" of the 3D scene. The sampling is performed by a rendering function, so as to produce said 2D projection image of the 3D scene 10, and is performed by the rendering function based on, inter alia, properties of the virtual camera 20. Such properties of the virtual camera 20, in turn, may comprise a position of the virtual camera 20 and a direction of the virtual camera 20 in relation to the virtual 3D scene 10 in question. In other words, the virtual camera 20 is w located at a particular point in virtual 3D space, and is directed in a particular virtual 3D space direction. The rasterized 2D image will depend on both the contents of the virtual 3D scene, as well as on the said camera 20 position and direction.

It is noted that the "virtual camera direction", as used herein, can be thought of as analogous to a relative location in virtual 3D space between the virtual camera 20 and the viewport 2, and in particular of an angular position in virtual 3D space of the viewport 2 in relation to the virtual camera 20.

The virtual camera 20 may also have additional static or variable properties, such as a viewing angle (corresponding to fisheye/tele), a lens correction transform, and similar, also affecting the final rasterized 2D image. Furthermore, the result of the sampling is also dependent on a current state of the 3D scene, in turn being dependent on a sampling time point.

It is noted that the term "bitmap" has a number of possible meanings. In the context of the present invention, and as is common in the field of computer graphics, it is used to refer to the concept of a spatially mapped array of pixels, which can also be known as a "pixmap". The term bitmap is not intended to convey any limitation in terms of the bit depth of the stored information. In the present invention, the bit depth of the stored information can be variable.

Figure 2:
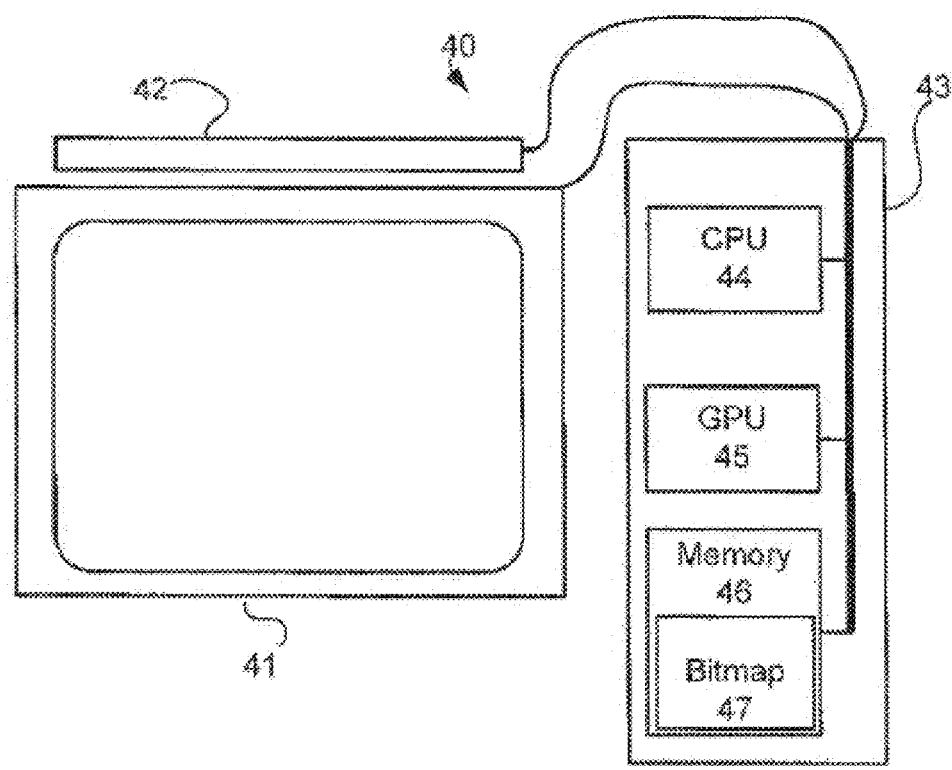
FIG. 2 is a diagram of a system for implementing gaze detection.

FIG. 2 shows a schematic view of a system 40 according to the present invention, in which the said gaze-detection may be implemented. The system 40 includes a screen 41 or a monitor 41 and gaze-detector (a gaze direction detection means) 42. The screen 41 may take a conventional or non-conventional form, including a virtual screen such as a retinal projector or a heads-up display in a vehicle. Both the gaze direction detection means 42 and the screen 41 are connected to a computer 43. In modern computers 43, the graphical processing unit (GPU) 45 is often 10-100 times faster than the central processing unit (CPU) 44 for parallelizable computations. As such, it is preferable to implement the present invention using the GPU 45. However, the invention could be implemented using any suitable processor such as a CPU 44.

The computer 43 further comprises a memory 46 into which the said 2D image can be stored as a bitmap 47.

Figure 3:
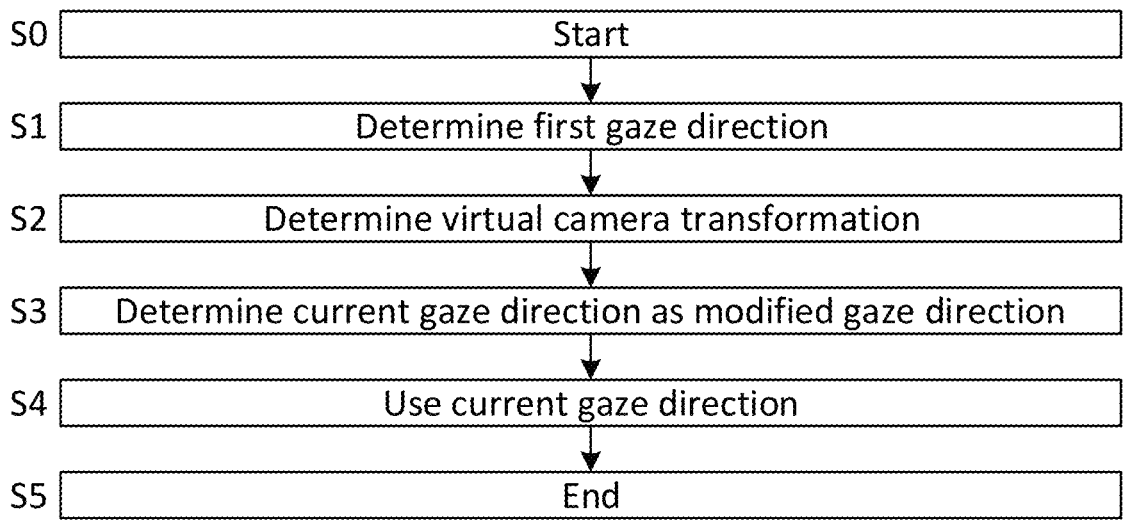
FIG. 3 is a flow chart illustrating a method according to the present invention.

FIG. 3 illustrates a method according to the present invention, for determining a current gaze direction of a user in relation to the 3D scene 10, which 3D scene 10 is sampled by a rendering function of the above described type to produce a 2D projection image of the 3D scene 10. As mentioned above, the 2D projection image is displayed on the screen 41, which screen 41 may correspond to the viewport 2. As also mentioned, the sampling is performed based on, inter alia, the virtual camera 20 in turn being associated with at least a position of the virtual camera 20 and a direction of the virtual camera 20 in the 3D scene.

In a first step S0, the method starts.

In a subsequent step S1, a first gaze direction of the user is determined, by a gaze direction detection means 42 comprised in the system 40. In particular, the first gaze direction may be determined by said gaze direction detection means 42 as, or based on, a measured physiological gaze direction of an eye of the user in relation to said 2D image, as described above.

Herein, a "gaze direction detection means" is to be interpreted as a per se known hardware device (or, as the case may be, a combination of hardware and software) arranged to, using a camera, capture an image of the eye of a user and to, based upon the captured image, using a computer circuit comprising a central processing unit, a memory and a communication bus, automatically determine a user gaze direction. Such a device is described in the above referenced U.S. Pat. No. 6,152,563.

This first gaze direction is determined at a first gaze time point $T_{G1}$ (see FIG. 4), and the first gaze direction is related to said 3D scene 10.

Figure 4:
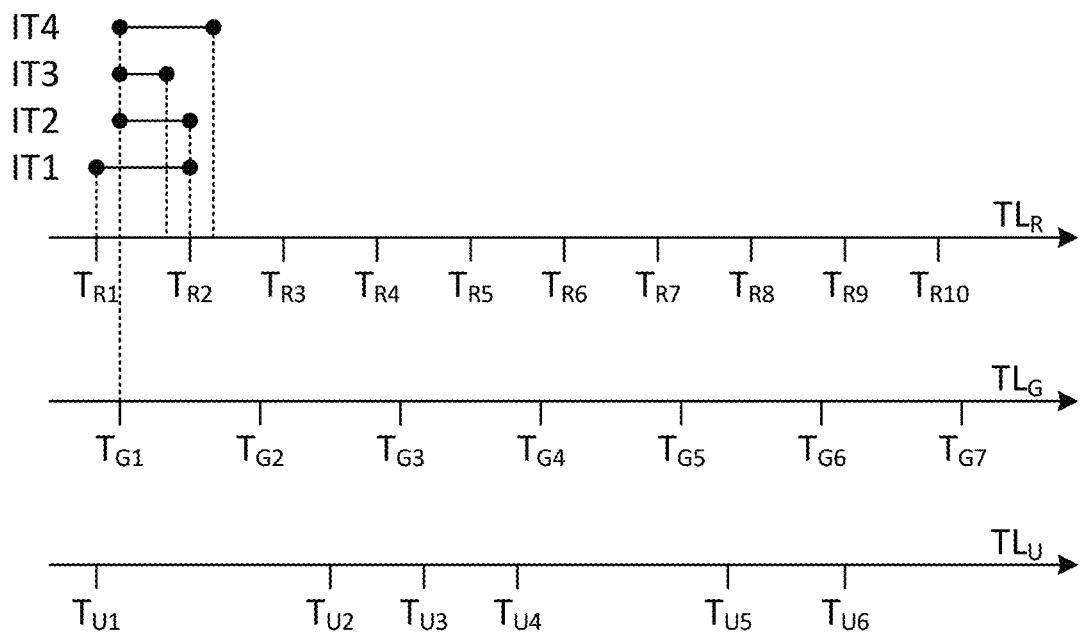
FIG. 4 is a time diagram illustrating different time lines used in a method according to the present invention.

FIG. 4 illustrates how this first gaze time point $T_{G1}$ relates to the various other time points mentioned in relation to the present method, using a set of different but (horizon-tally) synchronized time lines according to the following:

A rendering time line $TL_R$, illustrating sampling time points $T_{RX}$ of the said rendering function.

A gaze tracking time line $TL_G$, illustrating gaze time points $T_{GX}$, in other words time points when a gaze of the user in relation to the 2D image are determined using the gaze direction detection means 42. For instance, these gaze time points $T_{GX}$ may represent the capture time point of a respective image of the user's eye, containing the above described glint, for subsequent processing with the aim of determining the user's gaze at the gaze time point $T_{GX}$ in question.

A user/3D scene 10 interaction time line $TL_U$, illustrating user interaction time points $T_{Ux}$. Such user interaction time points $T_{Ux}$ denote the respective timing of events in or in relation to the 3D scene 10, such as objects 1 moving or the user performing interaction tasks of various types. Such events may or may not be due to, or related to, user gaze interaction.

As is clear from FIG. 4, the sampling may take place at roughly regular intervals, and in general at a sampling frequency which may be different from, such as smaller than, a gaze tracking frequency. The gaze time points may also be equidistantly, or at least substantially equidistantly, distributed along the time line $TL_G$. The user interaction time points $T_{Ux}$, on the other hand, may be distributed more or less irregularly along the time line $TL_U$, since they are due to user actions and/or game-internal events.

Typical sampling frequencies include 20-200 samplings/second and/or up to 144 samplings/second. Typical gaze detection frequencies include 1-300 detections/second; in some embodiments at least 30 detections/second; and in some embodiments up to 100 detections/second.

Hence, in general each sampling time point $T_{Rx}$ does not map 1:1 to a respective gaze time point $T_{Gx}$. At any rate, the time lines $TL_R$ and $TL_G$ are not organized so that each sampling time point $T_{Rx}$ will predictably correspond to a respective gaze time point $T_{Gx}$ which takes place at substantially the same time as the sampling time point $T_{Rx}$ in question.

Figure 5:
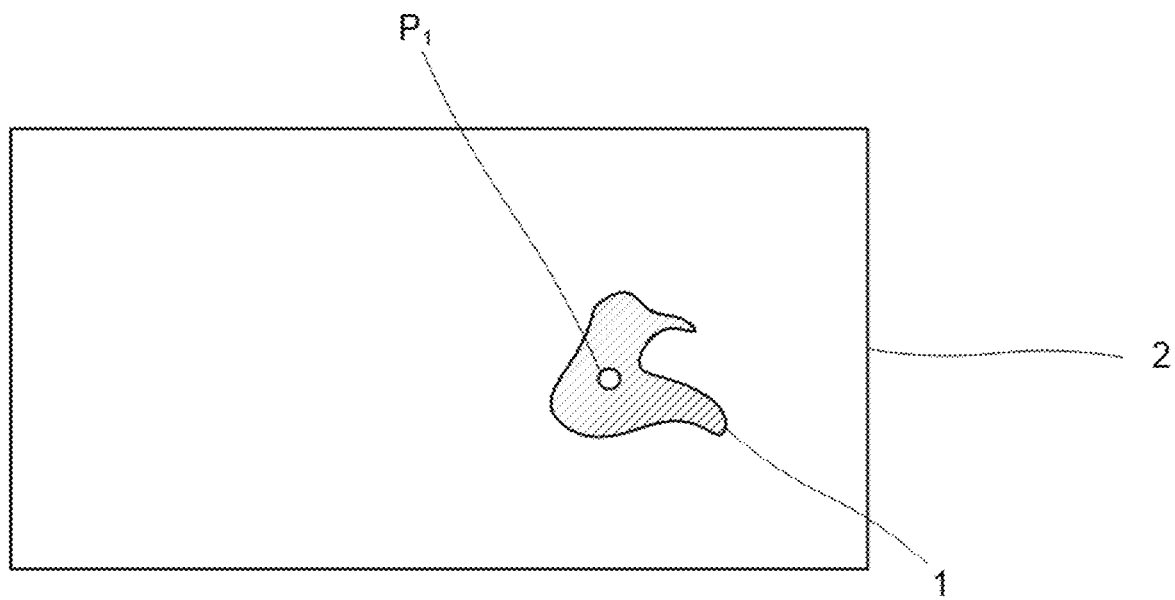
FIGS. 5-7 are respective views of an exemplifying screen at three consecutive points in time.

FIG. 5 illustrates the 2D image corresponding to the 3D scene, produced by said rendering function at first sampling time point $T_{R1}$, which is hence the 2D image which is viewed by the user at the gaze time point $T_{G1}$ (since the 2D image rendered at time point $T_{R1}$, and then displayed on the screen 41, is still visible on the screen at time point $T_{G1}$). In FIG. 5, an object 1 is shown, together with a point $P_1$ onto which the gaze of the user is directed, and which is the detected gaze point of the user on the screen at time point $T_{G1}$.

In a subsequent step S2, a virtual camera 3D transformation, in other words a transformation performed by the virtual camera 20, is determined. More particularly, the said 3D transformation represents a change of the position and/or direction of the virtual camera 20, which change takes place at least between the first gaze time point $T_{G1}$ and a second sampling time point $T_{R2}$, where the second sampling time point $T_{R2}$ is later than the first gaze time point $T_{G1}$. In this sense, the virtual camera 3D transformation is a time-dependent transformation.

Figure 6:
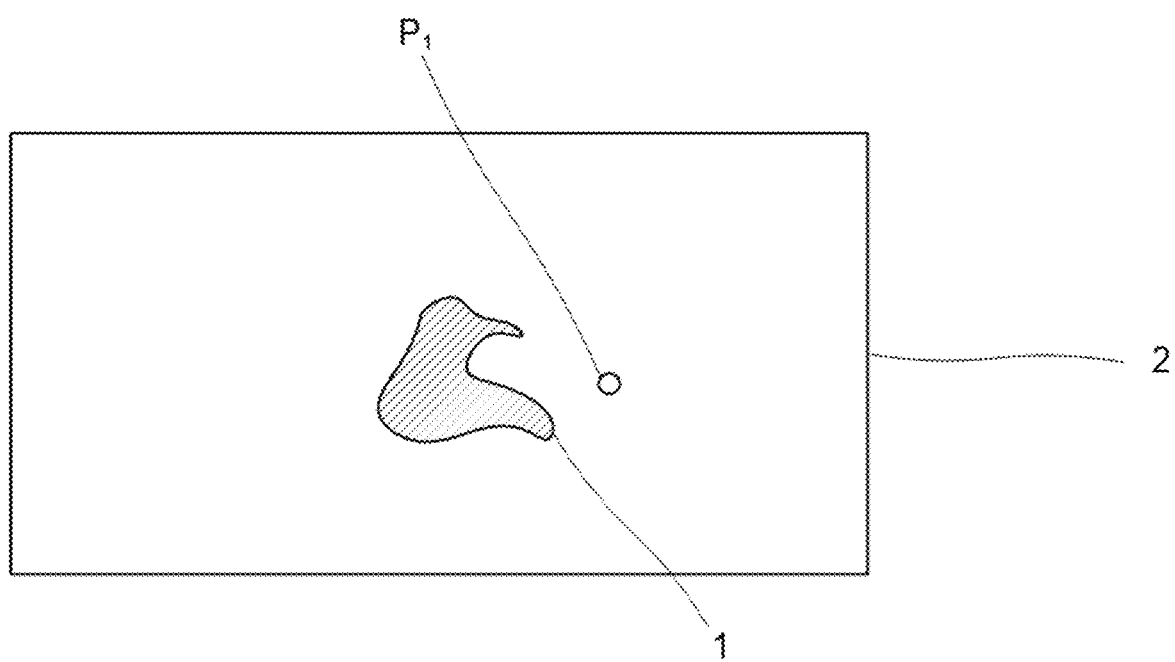

FIG. 6 illustrates the 2D image shown in FIG. 5, but after the virtual camera has been transformed using the 3D transformation. In this exemplifying case, the 3D transformation is a pure rotation of the camera to the right (in relation to the image shown in FIG. 6), resulting in that the object 1 moves to the left in the 2D image shown. However, it is noted that the user's gaze is still directed to the same point $P_1$ on the screen 41 as in FIG. 5.

In a subsequent step S3, the said current gaze direction is determined as a modified gaze direction. This modified gaze direction is "modified" in the sense that it is calculated based on the first gaze direction, and constitutes a modified version of this first gaze direction. The modification itself is calculated based on the said determined virtual camera 3D transformation, and in particular on an inverse of this transformation. The modification is determined so as to compensate the measured user gaze direction by taking into consideration the currently ongoing movement of the virtual camera 20.

In other words, the modified gaze direction is calculated based on both the first gaze direction and on an inverse of said time-dependent virtual camera 3D transformation.

Figure 7:
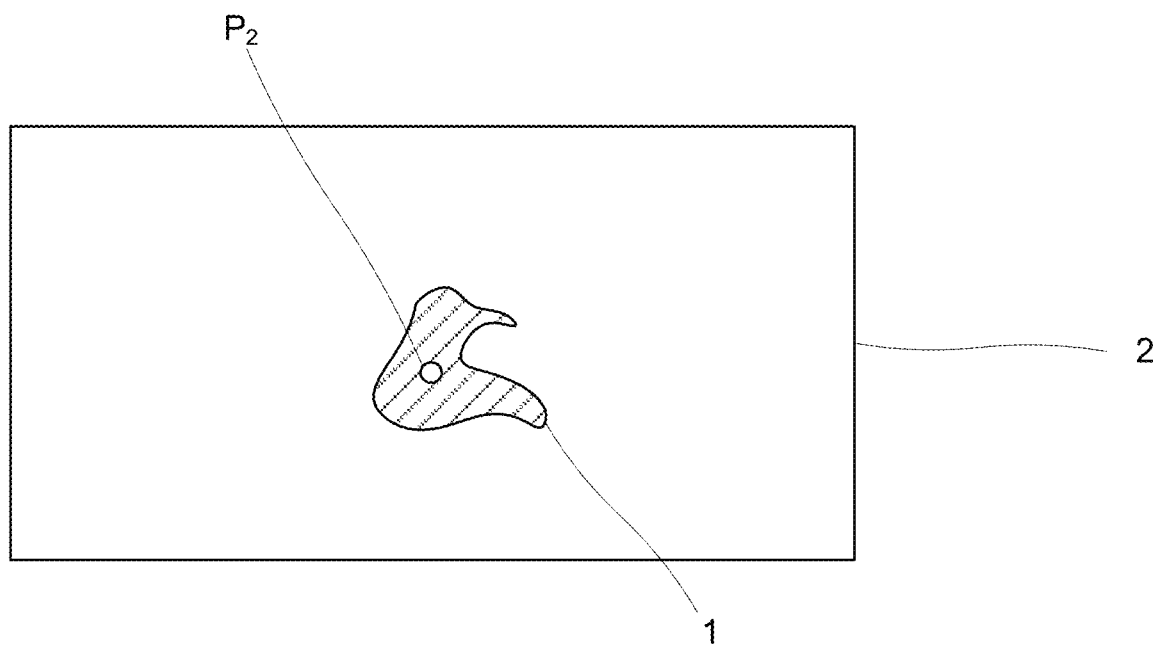

FIG. 7 illustrates the 2D image shown in FIGS. 5 and 6, but with the point $P_2$ on the 2D image illustrating the modified gaze direction. In FIG. 7, the preferred case in which the modified gaze direction has been modified to correspond to the inverse of the virtual camera 3D transformation describing the currently ongoing virtual camera 3D movement, resulting in that the modified gaze direction in FIG. 7 is fixed, or at least substantially fixed, in relation to the zone or object 1 as compared to in FIG. 5. This assumes that the object 1 is also fixed (non-moving) in relation to the scene 10.

In one or several subsequent steps S4, the determined current gaze direction may be used for any conventional or non-conventional purpose, and in particular as a direct or indirect input to a game engine or similar. This will be exemplified below.

Thereafter, the method ends S5.

Using such a system and such a method, and in particular by using the inverse of the time-dependent virtual camera 3D transformation to correct the measured current user gaze direction, in fact constituting an extrapolation of the user's gaze direction based on the assumption that the user inversely follows the virtual camera movements with her gaze, a more fluent user experience can be achieved. It is noted that the said assumption may be too simple to provide a realistic prediction. However, it has turned out that using this simple and naïve assumption provides remarkably improved results in terms of user experience fluency.

This is in particular the case in situations where the user locks her gaze onto an object 1 the movement of which is affected by a virtual camera position and/or direction change, in which case the user's gaze is more correctly estimated by an object locking mechanism. In this case, it is assumed that the user's gaze will continue to follow the path of the object 1 on the screen 2 even after the time point $T_{G1}$.

However, a more fluent user experience is also achieved when the virtual camera moves without the user currently actively following any object 1. Namely, after such a virtual camera movement, whatever zone the user's gaze was directed to on the screen 41 is likely to attract the interest of the user even after the virtual camera 20 movement, and hence be a likely target for an extrapolated gaze at time point $T_{R2}$.

It is specifically noted that the second sampling time point $T_{R2}$ is later than the first gaze time point $T_{G1}$. This means that, in various embodiments, the first sampling time point $T_{R1}$ (as well as any number of preceding sampling time points, as the case may be) may be later or prior to the first gaze time point $T_{G1}$.

Above, the virtual camera 3D transformation has been discussed as a virtual camera 20 "movement". It is realized that such movement may at least comprise a virtual camera rotation part, in other words that the direction of the virtual camera 20 is rotated about one, two or three axes in virtual 3D space. This may correspond to a rotation of the viewport 2 in virtual 3D space, a rotation about the position of the virtual camera 20 as a pivot point.

Such movement may, however, also (additionally/alternatively) comprise a virtual camera 3D linear/curvilinear translation part, in other words that the virtual camera is translated through virtual 3D space without its direction being changed.

Of course, the 3D transformation may also represent more complex movements, such as a combination of a translation across a linear or curvilinear path in space and a simultaneous virtual camera rotation. Other types of movements may also be used, alone or in combination with additional movements. For instance, the virtual camera 20 may be subjected to a zooming in or zooming out transformation. What is important is that any movement represented by the 3D transformation affects the 2D image rendered based upon the virtual camera 20.

In some embodiments, the virtual camera 3D transformation may be determined based on an interpolation, such as a linear interpolation, of the movement of the virtual camera 20 between said first sampling time point $T_{R1}$ and said second sampling time point $T_{R2}$. As is clear from FIG. 4, the first sampling time point $T_{R1}$ is before the second sampling time point $T_{R2}$. This interpolation time between the first sampling time point $T_{R1}$ and the second sampling time point $T_{R2}$ is herein denoted an "interpolation time", and is shown as IT1 in FIG. 4. Hence, it is assumed that the virtual camera 20 moves linearly across the interpolation time. This simplifies calculations.

It is noted that the interpolation may be based upon the virtual camera 20 movement during the interpolation time IT1 or based upon only a subset of the interpolation time, such as the time running between first gaze time point $T_{G1}$ and the second sampling time point $T_{R2}$, which subset of the interpolation time is denoted IT2 in FIG. 4.

In particular when the 3D transformation is determined based on an interpolation of the said type, an interpolation time of the interpolation in question may be adjusted so as to compensate for an estimation of a physiological latency for the eye movement of the user. Then, the virtual camera 3D transformation may be determined based on said interpolation using said adjusted interpolation time IT3. In FIG. 4, this concept is exemplified by the interpolation time IT3 being cut short by a suitable time period, such as 0.1-0.3 seconds, before the second sampling time point $T_{R2}$. In some embodiments this latency-compensating short time period is a first value for virtual camera 20 movements that are initiated by the user herself, such as by moving a computer mouse so as to affect the viewing direction in a 3D game; and a second for virtual camera 20 movements that are not initiated by the user, such as virtual camera 20 movements automatically resulting from a particular game design. Then, said first value may be smaller (shorter time period) than the second value.

The current user gaze direction may be determined for any desired time point, for which it is desirable to achieve an accurate estimation of the current gaze direction. Naturally, for is those of the gaze time points $T_{Gx}$ that already belong to the past this is not necessary, since for these time points accurate gaze direction estimations already exist, in the form of the gaze direction directly measured by the said gaze direction detection means 42. Hence, the current user gaze direction may be determined using the present method for any future time point, or for any past time point not being a gaze measured time point, such as any past time point after the last gaze time point $T_{Gx}$.

In a manner which is similar to said compensation for the user's physiological latency, it is also possible to take into consideration a hardware/software latency for the said rendering function to perform the said sampling (rendering), and to then as a the second sampling time point $T_{R2}$ use a projected future time point (in relation to the actual second sampling time point $T_{R2}$) taking said rendering latency into consideration. This is illustrated in FIG. 4, using IT4 as the interpolation time (ending after the time point $T_{R2}$). Suitable additional time for adjusting for the rendering latency depends on the hardware/software used to create the 3D scene 10, but may be about 0.01-0.10 s.

Depending on the complexity of the calculations that need to be performed in order to arrive at the modified gaze direction; the combination software/hardware used; and the prioritization between different processes, these very calculations may take a certain non-negligible time. In certain other contexts, the user's gaze direction is measured (temporarity or always) with relatively high frequency, providing a sufficiently fluent user experience.

In these and in other situations, the method may comprise the further steps of determining a time difference between the first gaze time point $T_{G1}$ and a time point for which the w current gaze direction is to be determined, such as the second sampling time point $T_{R2}$.

Then, the current gaze direction is only determined as being the said modified gaze direction in case said time difference is larger than a certain time difference threshold value. Hence, in the opposite case, when the time difference in question is smaller than, or at least as small as, the said threshold value, the last measured (at $T_{G1}$) gaze direction is simply used as-is. The time difference threshold value may be a static value, such as a value which is at the most 0.1 seconds, such as at the most 0.01 seconds, or be a dynamically calculated value which may take into consideration various dynamic parameters such as a current rendering frame rate; a current 3D scene 10 or game state; or a current hardware power availability, and to strike a desired balance between various such aspects affecting the current user experience.

Alternatively, or additionally, in some embodiments the method may further comprise the step of determining a current transformation velocity of the virtual camera 20 such as a current instantaneous virtual camera 20 rotation and/or translation velocity. Then, the current gaze direction may only be determined as being the modified gaze direction in case said determined transformation velocity is larger than a first transformation velocity threshold value. In other words, the user gaze compensation is only performed when the virtual camera 20 moves quickly at the instant moment; otherwise the detected user gaze is used as-is.

In a combination of these two, the mentioned time difference threshold value may be dynamically determined based on said determined current virtual camera 20 transformation velocity. Hence, when the virtual camera 20 undergoes a quick movement, a smaller largest time difference is accepted before a current gaze direction compensation according to the invention is performed.

In the above described exemplifying embodiments, the current user gaze direction is only compensated for (by determining the modified gaze direction) using information regarding an ongoing virtual camera 20 movement. However, in some embodiments of the present invention, information regarding an ongoing 3D scene 10 change may also be used as an input to the determination of the modified gaze direction.

Namely, the method may further comprise the step of determining a current 3D scene change transformation affecting at least a part of the 3D scene 10, the 2D projection of which is visible in the 2D projection image shown on the screen 41, such as present along the first gaze direction in said 2D projection image.

Then, the said modified gaze direction is calculated further based on the said current 3D scene 10 change transformation.

Such a 3D scene 10 change transformation may, for instance, be a translation and/or rotation and/or shape change of an object 1; a more general movement of subparts of the 3D scene in relation to other such subparts or in relation to a background of the 3D scene 10; the appearance and/or disappearance of objects 1 into and out from the 3D scene 10; and so forth. It is noted that such a 3D scene 10 change does not in itself involve a movement of the virtual camera 20.

One important example of a 3D scene 10 transformation is that an object 1 follows a deterministic or quasi-deterministic trajectory, such as a free fall trajectory of a thrown object or a road-bound trajectory of a moving vehicle. In this example, the modified gaze direction may take into consideration, in addition to the virtual camera 20 movement, also that the user is assumed to maintain a particular focussed zone in focus, such as gaze following a thrown object 1.

Another example is when the user interacts with the 3D scene 10 in a way which is at least partly predictable to a game engine responsible for maintaining and updating the 3D scene, such as the user shooting with a weapon or throwing an object in a game. Then, the modified gaze direction may take into consideration that the user will direct her gaze towards some type of "hot zone" arising due to the interaction in question, such as a hit location of a launched bullet in the 3D scene 10.

One possible use of a method according to the present invention is as a part of a method for identifying a particular object in a 3D scene 10 as the current gaze focus target of a user (GTOM systems, above). In general, such methods are well-known, and are described for instance in US 20160357255 A1 and US 20180300943 A1.

In the case of the present invention, such an object 1 identification method further comprises, firstly, determining a current gaze direction using the above described method, compensating the current user gaze at least using a virtual camera 20 transformation. Then, the current gaze direction determined as described above is used to identify said object 1. This use may take place in a way which is conventional as such, and represents an example of the use illustrated in the flow chart of FIG. 3.

In particular, the system according to the present invention, performing the user gaze direction determination, as well as a GTOM system or function, may both be external to the said rendering function, in the sense that both the determination of the current gaze direction (as described above) and the identifying of the said object 1 (using gaze to object mapping based on the modified user gaze direction) are performed without the rendering function obtaining direct information regarding the first gaze direction. In other words, the GTOM mapping is performed, based on the modified user gaze direction as described above, without the "raw" (non-modified) user gaze data being made available to the rendering function in connection to the GTOM mapping or even ever. This may mean that the rendering function is not provided with the measured user gaze direction in terms of a particular 3D angle, a (real) 2D on-screen coordinate or a (virtual) 3D coordinate in the virtual 3D scene 10 representing the current gaze direction and/or the current focus point of the user as measured by the gaze direction detection means 42.

On the other hand, in this case the rendering function, or a game engine responsible for the creation and maintaining of the 3D scene 10, may provide to the sub system responsible for determining the modified user gaze direction necessary information regarding the movements of the virtual camera 20 and movements of the 3D scene 10 or determining the modified user gaze direction.

This way, a user gaze detection based GTOM system may be provided as a standalone software or hardware entity, to be used with several different game engines or other entities arranged to create and maintain a 3D scene based user experience. Such a GTOM system may implement suitable interfaces for communicating with the gaze direction detection means 42 and a game engine or the like, which interfaces may be of a type which is conventional as such.

In particular, to such a GTOM system may be provided geometric information regarding the 3D scene 10, as well as virtual camera 20 information regarding the 3D direction of the virtual camera 20 and the 3D position of the virtual camera 20, from a particular system or system entity, such as a game engine or similar. This particular system or system entity may then also provide such geometric and camera information to said rendering function. For instance, the rendering function may form a part of the particular system or system entity.

Then, the said provided geometric and virtual camera 20 information may be used for determining said current gaze direction and/or for identifying said object by the GTOM system.

As mentioned above, 3D scene 10 movements can be used as a basis for determining the modified user gaze direction. One example of this is to determine, such as using a GTOM function, a currently focussed object 1, and then to use a movement of this object 1 in the 3D scene 10 as an input for determining the said modified user gaze direction.

In particular, the method according to the present invention may then further comprise the step of determining, using an object identification means, such as said GTOM function, an object 1 in said 3D scene 10, the 2D projection of which is present along the first gaze direction in said 2D projection image. In other words, an object 1 to which the user's gaze is currently directed is determined as a currently focussed object 1.

Thereafter, an object 1 movement transformation in said 3D scene 10 is determined, between a first object 1 movement time point and a second object 1 movement time point, where the second object 1 movement time point is later than both the first gaze time point $T_{G1}$ and the first object 1 movement time point. The first object 1 movement time point may, for instance, be the time point $T_{U1}$ as shown in FIG. 4, while the second object 1 movement time point may, for instance, be the time point $T_{U2}$.

Such an object 1 movement transformation may comprise a translation component; a rotation component; a shape change component; and so forth. It is then assumed that the user's gaze follows the focussed object 1 during said object 1 movement. The object 1 movement transformation may comprise at least some deterministic component, based upon which a projected or interpolated object 1 transformation may be determined and used for determining the modified user gaze direction.

Finally, the current gaze direction is determined, in addition to being based on the above described virtual camera 20 movement, also based on said object 1 movement transformation. It is noted that, in this case, the assumption used is that the user gaze follows a determined focussed object 1 also during a certain time period into the future.

As described above, the modification of the detected user's gaze direction may be subject to certain conditions, such as the virtual camera 20 moving quickly enough. Similarly, in some embodiments the present method may further comprise the step of determining a current virtual camera 20 transformation velocity of the above described type, and to calculate the modified gaze direction based on said object 1 movement transformation only in case said virtual camera 20 transformation velocity is larger than a second transformation velocity threshold value. This way, GTOM data is used for user gaze direction correction only when the virtual camera 20 is currently moving relatively quickly, when such correction is most warranted.

As mentioned above, in one aspect the present invention relates to a system for determining a current gaze direction of a user as described above. Such a system may be the system 40 illustrated in FIG. 2; a system arranged with suitable interfaces for communicating and collaborating with a 3D scene 10 producing system such as a game engine or other rendering function containing entity; or in the form of any other integrated or standalone system arranged to perform the method steps described herein. Such a system may comprise or be arranged to communicate with a GTOM system.

As also mentioned above, in another aspect the present invention relates to a computer software function arranged to, when executing, determine a current gaze direction of a user as described above. Such a computer software function may be arranged to execute on the hardware of, or from, a system of the said type. In particular, the computer software function may be provided as set of machine-readable instructions, such as a com-piled set of such instructions, residing on a non-transitory machine readable medium such as on a RAM or ROM memory of said system; it may be executable on a remote server but on the initiative of said system; or a combination of these two. It may also be arranged to execute on one single hardware instance or across a set of hardware instances, such as on a cluster of interacting servers online.

Phrased differently, the computer software function can be viewed as a corresponding computer software product, or a computer program. It generally comprises said machine-readable instructions.

The invention further relates to such a non-transitory machine readable medium having stored thereon instructions of the above said type.

The following pseudo code exemplifies one possible implementation of the determination of the modified user gaze direction:

```
Measure the rotational speed of the virtual camera 20; store in CameraRotation
Sync game time line TL_R to eye tracker timer TL_G.
On each rendered frame do:
    Grab time delta between the last gaze point T_{Gx-1} and current game time T_{Rnow}; store
    it in TimeDelta
    Calculate modified gaze vector CorrectedGazeVector as:
        CounterRotation = TimeDelta * -CameraRotation
        CorrectedGazeVector = CounterRotation.RotateVector(OriginalGazeVector)
```

Above, preferred embodiments have been described. However, it is apparent to the skilled person that many modifications can be made to the disclosed embodiments without departing from the basic idea of the invention.

For instance, the method described above may comprise many additional features, apart from the ones described herein, such as built-in user interaction functionality.

The use of the determined current user gaze direction can vary. For instance, a possible use is for locally increasing a 2D sampled image quality in the vicinity of a currently focussed zone of the screen 41, in order to prioritize computer resources for providing a more high quality user experience from a computer graphics point of view.

A computer software function according to the invention may also be an integrated part of a computer game or any other complex computer software function. It may also be installed on a gaze direction detection means such as the means 42 disclosed in FIG. 2.

In general, all which has been said herein regarding the method is equally applicable to the said system and computer software function, and vice versa.

Hence, the invention is not limited to the described embodiments, but can be varied within the scope of the enclosed claims.

The invention claimed is:

1. A method for determining a current gaze direction of a user in relation to a three-dimensional ("3D") scene, the 3D scene is sampled by a rendering function to produce a two-dimensional ("2D") projection image of the 3D scene, the sampling is performed based on a virtual camera in turn being associated with a camera position and camera direction in the 3D scene, wherein the method comprises the steps:
   determining, by a gaze direction detection means, a first gaze direction of the user at a first gaze time point, the first gaze direction is related to said 3D scene;
   determining a time-dependent virtual camera 3D transformation, the time-dependent virtual camera 3D transformation representing a change of a virtual camera position and/or virtual camera direction between the first gaze time point and a second sampling; and
   determining the current gaze direction as a modified gaze direction, in turn calculated based on the first gaze direction, and further calculated based on an inverse of the time-dependent virtual camera 3D transformation.

2. The method according to claim 1, wherein
   the virtual camera 3D transformation is a determined time point, where the second sampling time point is later than the first gaze time point; and
   said time dependent virtual camera 3D transformation is calculated based on an interpolation between a first sampling time point and said second sampling time point, where the first sampling time point is before the second sampling time point.

3. The method according to claim 2, wherein
   an interpolation time of the said interpolation is adjusted so as to compensate for an estimation of a physiological latency for eye movement of the user, and wherein
   the virtual camera 3D transformation is determined based on said interpolation using said adjusted interpolation time.

4. The method according to claim 1, wherein the virtual camera 3D transformation comprises a camera rotation part.

5. The method according to claim 1, wherein the virtual camera 3D transformation comprises a camera translation part.

6. The method according to claim 1, wherein
   the second sampling time point is a projected future time point taking into consideration an expected time for the rendering function to perform said sampling.

7. The method according to claim 1, further comprising:
   determining a time difference between said first gaze time point and a time point for which the current gaze direction is to be determined; and
   wherein the current gaze direction is only determined as being the modified gaze direction in case said time difference is larger than a time difference threshold value.

8. The method according to claim 7, wherein
   the said time difference threshold value is determined based on said current virtual camera transformation velocity.

9. The method according to claim 1, further comprising:
   determining a current virtual camera transformation velocity; and wherein
   the current gaze direction is only determined as being the modified gaze direction in case said current virtual camera transformation velocity is larger than a first transformation velocity threshold value.

10. The method according to claim 1, wherein
    the said first gaze direction is determined by said gaze detection means as, or based on, a measured physiological gaze direction of an eye of the user in relation to said 2D image.

11. The method according to claim 1, wherein the method further comprises:
    determining a current scene change transformation, affecting a part of the scene the 2D projection of which is present visible in the 2D projection image; and
    wherein the modified gaze direction is calculated further based on the said current scene change transformation.

12. A method for identifying an object in a 3D scene which is a current user gaze focus target, wherein the method comprises:
    determining a current gaze direction by determining, using a gaze direction detection means, a first gaze direction of the user at a first gaze time point, wherein the first gaze direction is related to said 3D scene;
    determining a time-dependent virtual camera 3D transformation, wherein the time-dependent 3D transformation represents a change of a virtual camera position and/or virtual camera direction between the first gaze time point and a second sampling time point, where the second sampling time point is later than the first gaze time point; and determining the said current gaze direction as a modified gaze direction, in turn calculated based on the first gaze direction, and further calculated based on an inverse of the time-dependent virtual camera 3D transformation.

13. The method according to claim 12, wherein both the determination of the current gaze direction and the identifying of the said object are performed without a rendering function obtaining direct information regarding the said first gaze direction.

14. The method according to claim 13, wherein geometric information regarding said 3D scene, as well as virtual camera information regarding the virtual camera direction and the virtual camera position, is provided from a particular system entity, wherein the particular system entity also provides such geometric and camera information to said rendering function, and wherein the said provided geometric and camera information is used for determining said current gaze direction and/or for identifying said object.

15. The method according to claim 12, wherein the method further comprises the steps:

determining, using an object identification means, an object in said 3D scene a 2D projection of which is present along the first gaze direction in a 2D projection image;

determining an object movement transformation in said 3D scene between a first object movement time point and a second object movement time point, where the second object movement time point is later than both the first gaze time point and the first object movement time point; and determining said current gaze direction further based on said object movement transformation.

16. The method according to claim 15, wherein the method further comprises:

determining a current virtual camera transformation velocity; and wherein the modified gaze direction is only calculated based on said object movement transformation in case said transformation velocity is larger than a second transformation velocity threshold value.

17. A non-transitory computer readable medium comprising computer readable instructions that, when executed by a processor, cause the processor to perform operations for determining a current gaze direction of a user in relation to a three-dimensional ("3D") scene, the 3D scene is sampled by a rendering function to produce a two-dimensional ("2D") projection image of the 3D scene, wherein the sampling is performed based on a virtual camera in turn being associated with a camera position and camera direction in the 3D scene, said operations comprising:

determining, by a gaze direction detection means, a first gaze direction of the user at a first gaze time point, wherein the first gaze direction is related to said 3D scene;

determining a time-dependent virtual camera 3D transformation, wherein the time-dependent virtual camera 3D transformation represents a change of a virtual camera position and/or virtual camera direction between the first gaze time point and a second sampling time point, where the second sampling time point is later than the first gaze time point; and determining the said current gaze direction as a modified gaze direction, in turn calculated based on the first gaze direction, and further calculated based on an inverse of the time-dependent virtual camera 3D transformation.

* * * * *